(12) United States Patent
Haas et al.

(10) Patent No.: US 9,144,871 B2
(45) Date of Patent: Sep. 29, 2015

(54) LANCE UNIT AND SPINDLE COMPRISING THE SAME

(75) Inventors: Reiner Haas, Metzingen (DE); Juergen Keppler, Pfullingen (DE)

(73) Assignee: BIELOMATIK LEUZE GMBH & CO. KG, Neuffen (DE)

( * ) Notice: Subject to any disclaimer, the term of this patent is extended or adjusted under 35 U.S.C. 154(b) by 960 days.

(21) Appl. No.: 13/254,991

(22) PCT Filed: Mar. 5, 2010

(86) PCT No.: PCT/EP2010/001379
§ 371 (c)(1),
(2), (4) Date: Dec. 2, 2011

(87) PCT Pub. No.: WO2010/099972
PCT Pub. Date: Sep. 10, 2010

(65) Prior Publication Data
US 2012/0093605 A1    Apr. 19, 2012

(30) Foreign Application Priority Data
Mar. 5, 2009 (DE) .................. 10 2009 011 336

(51) Int. Cl.
*B23Q 11/10* (2006.01)
(52) U.S. Cl.
CPC .............. *B23Q 11/10* (2013.01); *B23Q 11/103* (2013.01); *B23Q 11/1015* (2013.01); *B23Q 11/1046* (2013.01); *Y10T 409/303976* (2015.01); *Y10T 409/304032* (2015.01)

(58) Field of Classification Search
CPC ........................... B23Q 11/10; B23Q 11/1015
USPC .................. 409/135, 136; 408/56, 57, 58
See application file for complete search history.

(56) References Cited

U.S. PATENT DOCUMENTS

| 2,704,695 | A | * | 3/1955 | Ricefield | 384/497 |
| 5,676,506 | A | | 10/1997 | Sugata | |
| 5,960,617 | A | * | 10/1999 | Sheldon | 56/17.5 |
| 6,413,028 | B1 | * | 7/2002 | Lind | 409/233 |
| 2004/0067113 | A1 | * | 4/2004 | Sugata et al. | 408/56 |
| 2009/0034892 | A1 | * | 2/2009 | Akamatsu et al. | 384/473 |

FOREIGN PATENT DOCUMENTS

| DE | 196 55 334 B4 | 5/2006 |
| EP | 1 375 063 A1 | 1/2004 |
| WO | WO02/064310 A1 | 8/2002 |
| WO | WO03/106104 A1 | 12/2003 |

* cited by examiner

*Primary Examiner* — Eric A Gates
*Assistant Examiner* — Paul M Janeski
(74) *Attorney, Agent, or Firm* — Factor Intellectual Property Law Group, Ltd.

(57) ABSTRACT

A spindle which can be used by using the two-channel minimal quantity lubrication. The feeding of the lubricating oil is done by way of a central oil tube which is rotationally fixedly joined to a fixed base piece and which is radially supported on the revolving spindle in the radial direction by way of at least one pivot bearing.

28 Claims, 13 Drawing Sheets

LANCE UNIT AND SPINDLE COMPRISING THE SAME

RELATED APPLICATIONS

This application claims the filing benefit of International Patent Application No. PCT/EP2010/001379, filed Mar. 5, 2010, which claims the filing benefit of German Patent Application No. 10 2009 011 336.3 filed Mar. 5, 2009, the contents of which are incorporated herein by reference.

TECHNICAL FIELD

The invention relates to a lance unit for fitting into a spindle of a machine tool and to a spindle comprising such a lance unit.

BACKGROUND OF THE INVENTION

Two channel minimal quantity lubrication (MQL) devices are known, in which in the vicinity of the point of contact between a tool such as a drill bit and a workpiece a mixture of air and lubricant is produced, which contains a very low proportion of lubricant. Such an MQL device may be inferred for example from DE 196 55 334 B4.

In this known MQL device the lance unit rotates with the spindle, thereby necessitating a high-precision and costly rotary coupling at the rear end of the lance unit because spindles in modern machining centres rotate at up to 20,000 rpm and fluids are to be handled at pressures of 8 bar and more.

The present invention is directed to providing a device that addresses these and other matters.

SUMMARY OF THE INVENTION

An object of the present invention is to provide a lance unit in such a way that it is possible to dispense with a costly rotary coupling at the rear end of the lance.

This object may be achieved by providing a lance unit and/or a spindle having the features of one or more embodiments of the present invention.

In the lance unit and/or spindle according to one or more embodiments of the present invention the liquid pipe carrying the liquid lubricant is connected in a rotationally fixed manner to the base part. The free end of the liquid pipe together with the adjacent rotating parts of the spindle itself form a kind of rotary coupling, which however need not be machined to a high degree of precision because a good fluidic seal is obtained by means of the gas stream that under operating conditions flows paraxially over the outside of the liquid pipe. The quantities of lubricant that are discharged from the end of the liquid pipe are moreover so small that a pressure-tight liquid seal is not necessary here. The corresponding small liquid volumes, as they are discharged from the end of the liquid pipe, are carried away by the air stream sweeping over the lance end.

With the lance unit according to one or more embodiments of the present invention even in the case of a large length it is nevertheless ensured that the lance unit in the spindle is well able to withstand the mechanical loads, to which it is subject there during operation, in particular the transverse accelerations that arise when the spindle is traversing from one working point to another.

The pivot bearings provided according to one or more embodiments of the present invention are used to support the liquid pipe, which for reasons of space or material cannot be of an absolutely rigid construction, radially against preset points and hence prevent bending of the liquid pipe, which might lead to undesirable contact with a rotating part of the spindle, which may rapidly lead to damage of the liquid pipe on account of the high rotational speeds of the spindle.

This support is effected either directly against a spindle bore or against a bore of a part connected to the spindle, such as a collet chuck actuating rod. These bores are to be understood below collectively by bearing bore, i.e. a bore, against which the liquid feed pipe of the lance unit is transversely supported.

Additional advantageous developments of the invention are indicated in further embodiments of the present invention.

In the case of liquid pipes that are not too long and have good rigidity, it is often sufficient to support the liquid pipe against a single point spaced apart from the foot of the pipe.

In the case of longer liquid pipes, if a plurality of spaced-apart pivot bearings are provided in accordance with some embodiments of the present invention, it is possible to dispense with increasing the wall thickness of the liquid pipe, a measure that is occasionally not possible for reasons of space. The locations of the pivot bearings are, roughly speaking, so selected that they are situated at the places where the operation-related excursions from the spindle axis are at their greatest. Typically, these are regions that are situated at excursion- or oscillation antinodes.

The development of one or more embodiments of the present invention makes it possible to provide the pivot bearings at a defined distance from one another but to fit pivot bearings and liquid pipe as a preassembled unit into the spindle. There is therefore also no need to provide a stop shoulder or the like on the bearing bore that receives the lance unit. A further advantage is that between the pivot bearings and either the bearing bore or the outer surface of the liquid pipe it is possible to allow axial relative movements, such as are required if the lance unit is disposed in the interior of a hollow tie rod, which is provided in many spindles for actuating a collet chuck, by means of which tool carriers carrying the tools are detachably braceable with the spindle.

In certain embodiments of the present invention, pivot bearings are provided at preferred locations. These locations correspond to oscillation antinodes.

In a lance unit according to one or more embodiments of the present invention, the entire arrangement of liquid pipe and pivot bearings is preassembled in a cartridge that may easily be mounted in a bearing bore. The provision of such a finished sub-unit is of particular interest because the lance unit are of a very compact construction in radial direction and represent a precision-engineered precision unit that remains the preserve of experts.

In one or more embodiments of the present invention, a pivot bearing may be concretely configured. Here, in particular the choice depends on how large the bearing is in radial direction, the rotational speeds that the bearing endures, the extent to which air may flow through the pivot bearing, and the radial forces that have to be taken up by the pivot bearing.

Particularly preferred in one or more embodiments of the present invention are the plain bearings which are notable for high speed resistance and particularly low friction combined with a mechanically simple construction. Such bearings may also easily be configured in such a way that air may flow through them in axial direction.

Sliding layers of the type proposed in accordance with one or more embodiments of the present invention do admittedly have good sliding properties but are often brittle and are frequently impossible to produce in situ on a liquid pipe. The development according to another embodiment of the present invention makes it possible to manufacture corresponding bearing sleeves as separate parts that are then mounted with a finished sliding layer onto the liquid pipe.

By virtue of the development of the invention according to one or more embodiments of the present invention, the annular space that remains between the outer surface of the liquid pipe and the inner surface of a bearing bore that receives the lance unit may be used to transport gas, which is used to feed the lubricant in small portions to the point of contact between tool cutting edge and material of the workpiece.

By virtue of the development of the invention according to one or more embodiments of the present invention it is possible to reduce the swirl that is imparted to the gases flowing through the bearings by the passages of the pivot bearings.

The development of the invention according to one or more embodiments of the present invention is advantageous in view of the fact that the radial supporting forces that are needed at various points of the liquid pipe are different. However, if a bearing, given the same installation space, needs to produce only a lower supporting force, it may be optimized in respect of other parameters, for example service life or air permeability.

The development of the invention according to one or more embodiments of the present invention makes it possible to displace the entire lance unit by a small amount in axial direction. This allows the entire lance unit to follow the adjusting movement of a tie rod, which is used to actuate a tool carrier collet chuck disposed in the end of the spindle. There is therefore no need to provide any axial relative mobility between the outer race of the pivot bearing and the receiving bore of the spindle for the lance unit.

In a lance unit according to one or more embodiments of the present invention, the gas pipe, which provides the gas that carries the small liquid volumes to the working point, is also fixed in direction of rotation. Just like the liquid pipe, the gas pipe may also be already connected to the base part in the works. The lance unit therefore comprises the entire liquid feed and gas feed of the minimal quantity lubrication.

In a lance unit according to one or more embodiments of the present invention, the air pipe and the liquid pipe are mechanically connected to one another by one or more air-permeable distance parts and therefore form an extremely stable, rigid shell structure.

In this case then according to one or more embodiments of the present invention, the same advantages are obtained, namely usability in a spindle with tie rod for actuating a collet chuck, as has already been described above with reference to other embodiments described herein.

In a lance unit according to one or more embodiments of the present invention the liquid pipe is able to tilt slightly at the bearing points. This prevents localized high flexural torques that otherwise act at the bearing points upon the wall of the liquid pipe. Such loads might lead during continuous operation to fatigue fractures.

The effect achieved by the development of the invention according to one or more embodiments of the present invention is that the pivot bearing provided with the connection part is movable under spring action relative to a bearing bore that receives it, is tiltable relative to the axis of this bearing bore, and is displaceable in axial direction along the bearing bore.

These advantages may by obtained according to one or more embodiments of the present invention, in which the clear cross section of the bore that receives the bearing arrangement is not significantly impaired in the region lying between the bearings.

The development of the invention according to one or more embodiments of the present invention is advantageous in view of good axial displaceability of the pivot bearing relative to the bearing bore, wherein at the same time good torque transmission through the connecting part to the bearing bore is obtained.

The development of the invention according to one or more embodiments of the present invention is advantageous in view of the symmetry of the bearing point. If there are two more closely adjacent pivot bearings, this is advantageous also in terms of failure safety because, in the event of wear or failure of one of the bearings, its function may be taken over by the other bearing.

In the development of the invention according to one or more embodiments of the present invention it is guaranteed that the various pivot bearings operate with low friction and exhibit only low wear also over a prolonged service period.

In a spindle according to one or more embodiments of the present invention, the gas that feeds tiny droplets of lubricant to the work point is directed through the spindle itself. As a result, on the one hand an additional cooling of the spindle is achieved and on the other hand there is slightly more room in the spindle bore that receives the lance unit. This makes it possible for example to design the tie rod, which is used to actuate the collet chuck, with a slightly thicker wall so that the collet chuck may be operated with very high actuating forces and nevertheless have a long service life.

The effect achieved by the development of the invention according to one or more embodiments of the present invention is that the machining of the spindle that is necessary to provide the gas channel is particularly easy.

The alternative according to one or more embodiments of the present invention is used preferably when the spindle bore as such provides enough room to transport the gas and a bypass has to be provided only at the pivot bearings because these are not gas-permeable or are gas-permeable to a limited extent. This bypass may then be realized simply by cutting inwardly open grooves into the inner wall of the spindle bore. The outer race of the pivot bearings is then defined by the inner end faces of the ribs left between the grooves.

By virtue of the development of the invention according to one or more embodiments of the present invention it is possible for the actuation of the tool carrier collet chuck and the feed of lubricant and gas to be accommodated in a compact manner in the interior of the spindle.

The effect achieved by the development of the invention according to one or more embodiments of the present invention is that between the lumen of the tie rod and the exterior thereof it is possible to establish a flow connection, which as a whole has a good cross section of passage, but in peripheral direction extensively retains the load-bearing material of the axially loaded tie rod.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

There now follows a detailed description of embodiments of the invention with reference to the drawings. These show.

DETAILED DESCRIPTION OF THE PRESENT INVENTION

Figure 1:
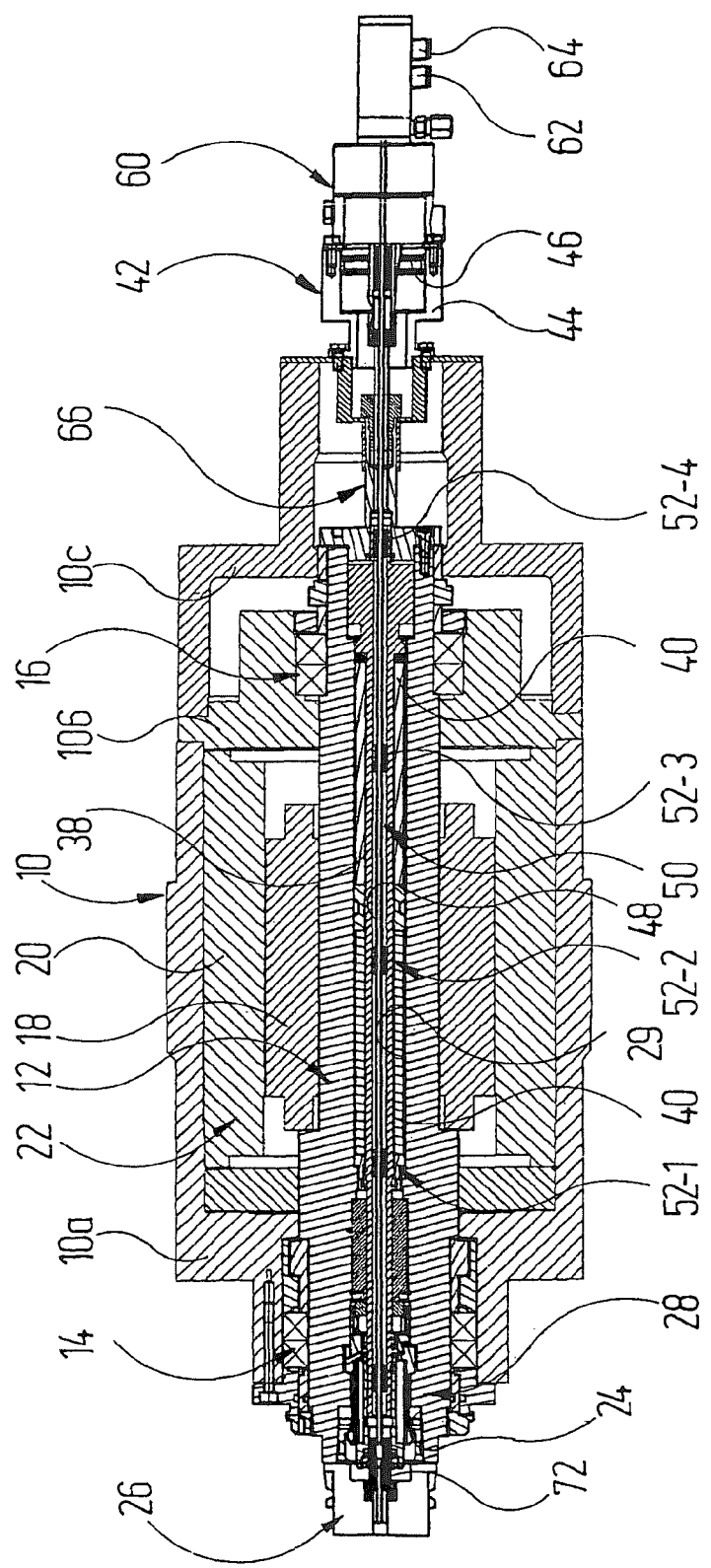
FIG. 1 an axial section through the spindle of a machine tool with an inserted MQL lance unit.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIG. 1, 10 denotes a spindle housing consisting of a plurality of axially screw-connected housing segments 10a, 10b and 10c.

In the spindle housing a spindle 12 is supported by means of bearings 14, 16. The spindle 10 in its middle portion carries a rotor 18, which together with a stator 20 forms a spindle motor 22.

Provided on the, in FIG. 1 left, end of the spindle 12 is a collet receiver 24 roughly in the shape of a truncated cone. The cone of a tool carrier 26 may be received in the collet chuck receiver 24, and for twist-locking tool carrier 26 and spindle 12 a collet chuck denoted as a whole by 28 is provided, comprising in a known manner resilient clamping arms 30, which at the front end are provided with lugs that cooperate with a retaining shoulder 32 of a recess 34 that is provided in the end face of the tool carrier 26.

The clamping arms 30 are pressed into their position, in which they lock the tool carrier 26, by means of an actuating sleeve 36 that is screwed onto the end of a hollow tie rod 38 guided slidingly in a spindle bore 29. The tie rod 38 is preloaded, in the drawing to the right, by means of a cup-spring assembly 40 and may be moved, in the drawing to the left, by means of a clamping cylinder 42 lying axially outside of the spindle, with the result that the lugs of the clamping arms 30 move clear of the retaining shoulder 32.

The clamping cylinder 42 comprises a cylinder 44, as well as a piston 46 that is movable therein and connected to the right end of the tie rod 38.

Pressure medium channels that are not reproduced in the drawing are used to feed pressurized hydraulic fluid to the respective required working chamber of the clamping cylinder 42.

Extending centrally in a longitudinal bore, denoted by 48, of the tie rod 28 is an oil pipe 50, which is fixed in direction of rotation and is supported via pivot bearings 52-1, 52-2 and 52-3 at three axially spaced-apart points radially against the bore 48 of the tie rod 38. The pivot bearings 52 are in each case a plain bearing comprising a central hub portion 54, from which three ribs 56 run radially outwards.

The plain bearing sleeves are manufactured from a carbon material that runs with a low coefficient of friction along the outer surface of the oil pipe 50, which is manufactured from high-grade steel. The ribs 56 are seated in an interference fit on the inner surface of the bore 48 and the hub part 54 cooperates in the sliding play with the outer surface of the oil pipe 50.

There are typically three ribs 56 distributed in peripheral direction, the thickness of which is selected such that they are able to withstand the radial loads of the pivot bearing that are to be expected during operation, but to the extent that is compatible with stability care is taken to ensure that the grooves 58 left between the ribs 56 are as large as possible so that the pivot bearing as a whole has good permeability to air in axial direction.

As is evident from FIG. 1, the oil pipe 50 runs in axial direction beyond the end of the spindle 12 and the end of the tie rod 28 and extends into a base part 60 that is de-spun. The base part 60 has two connections 62, 64 for lubricating oil and compressed air respectively.

The oil pipe 52, the clamping cylinder 42 and the base part 60 form together with the pivot bearings 52 a lance unit 66 that is capable of providing a lubricant/air mixture with a low lubricant content at the end situated on the left in the drawing. For this purpose, the interior of the bore 48 is loaded with compressed air via the base part 60, while the interior of the oil pipe 50 is loaded with lubricating oil from the base part 60.

Integrated into the base part 60 is a dosing valve, which under the control of a control unit (not represented) opens for short time intervals so that in a corresponding manner in each case a small volume of liquid is pushed out of the front end—situated on the left in the drawing—of the oil pipe 50. This small oil volume, which on separating from the end of the oil pipe 50 is split into smaller fractions, is then carried to the left in the drawing by the air flowing towards it along the outer surface of the oil pipe 50.

The oil/air mixture thus obtained is taken over by a mixture channel 68, which is formed in a channel sleeve 70 screwed into a connection socket 72 that is connected to the tool carrier 26. The mixture then passes to the tool receiver—to be imagined on the left in the drawing—of the tool carrier and, from there, into the lubricant channels of the tool (not represented).

As is evident from the drawing, the mixture channel 68 surrounds the free end of the oil pipe 50 with slight radial clearance and has a narrowing 74 downstream of the end of the oil pipe 50.

A lip seal 76 seals off the outer surface of the connection socket 72 in the direction of the tie rod 38.

In the spindle described above, the oil pipe 50 is able to move in axial direction relative to the tie rod. 38 because the plain pivot bearings 52 realize a pivot bearing arrangement as well as an axial bearing arrangement.

Figure 2:
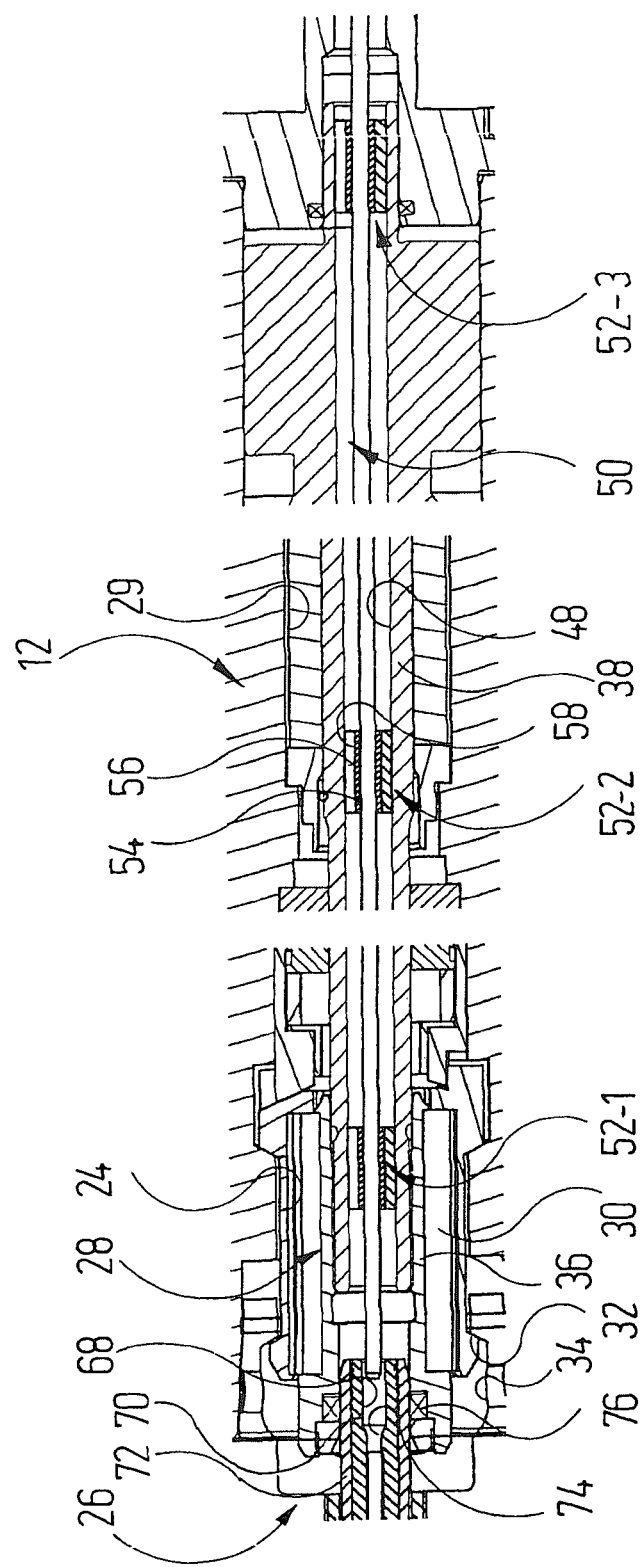
FIG. 2 an enlarged view of the end portion of the spindle according to FIG. 1 and of an intermediate portion of the spindle.
Figure 3:
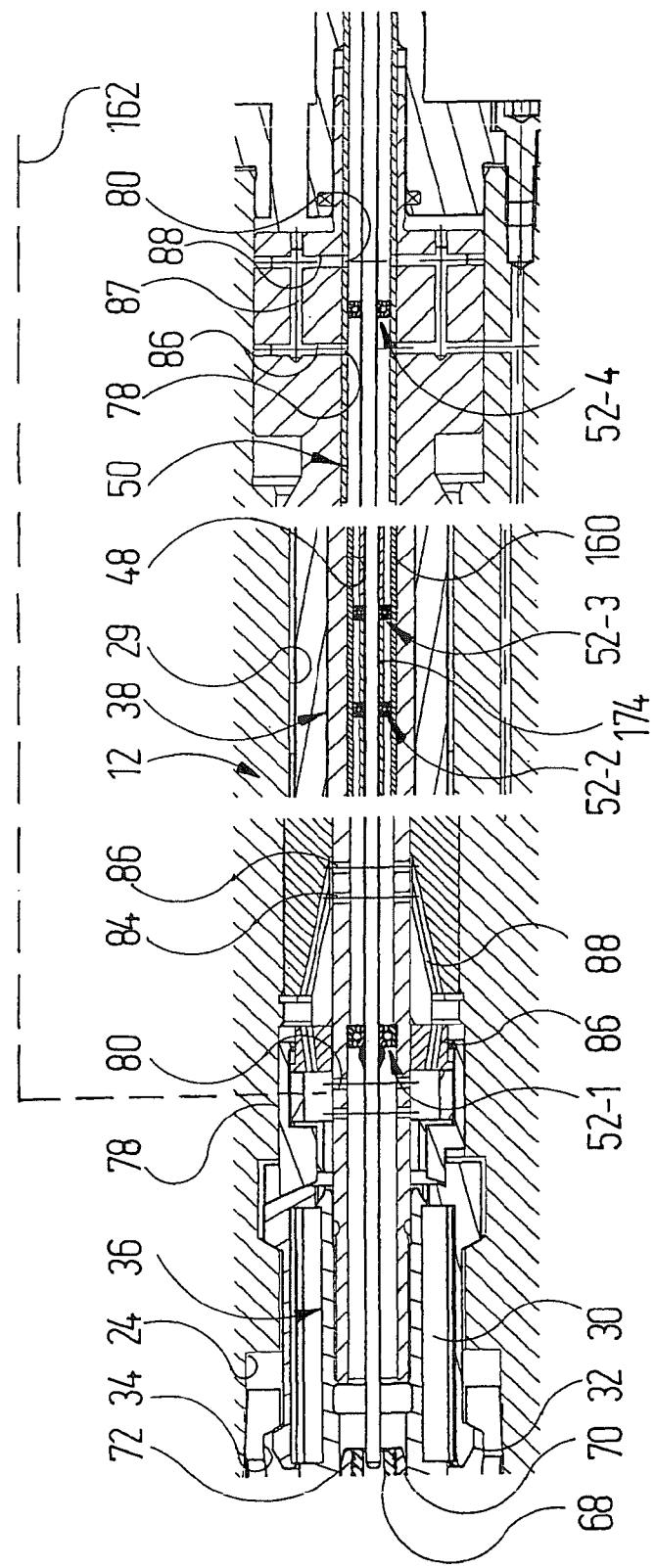
FIG. 3 an axial section through a base part of the lance unit.
Figure 4:
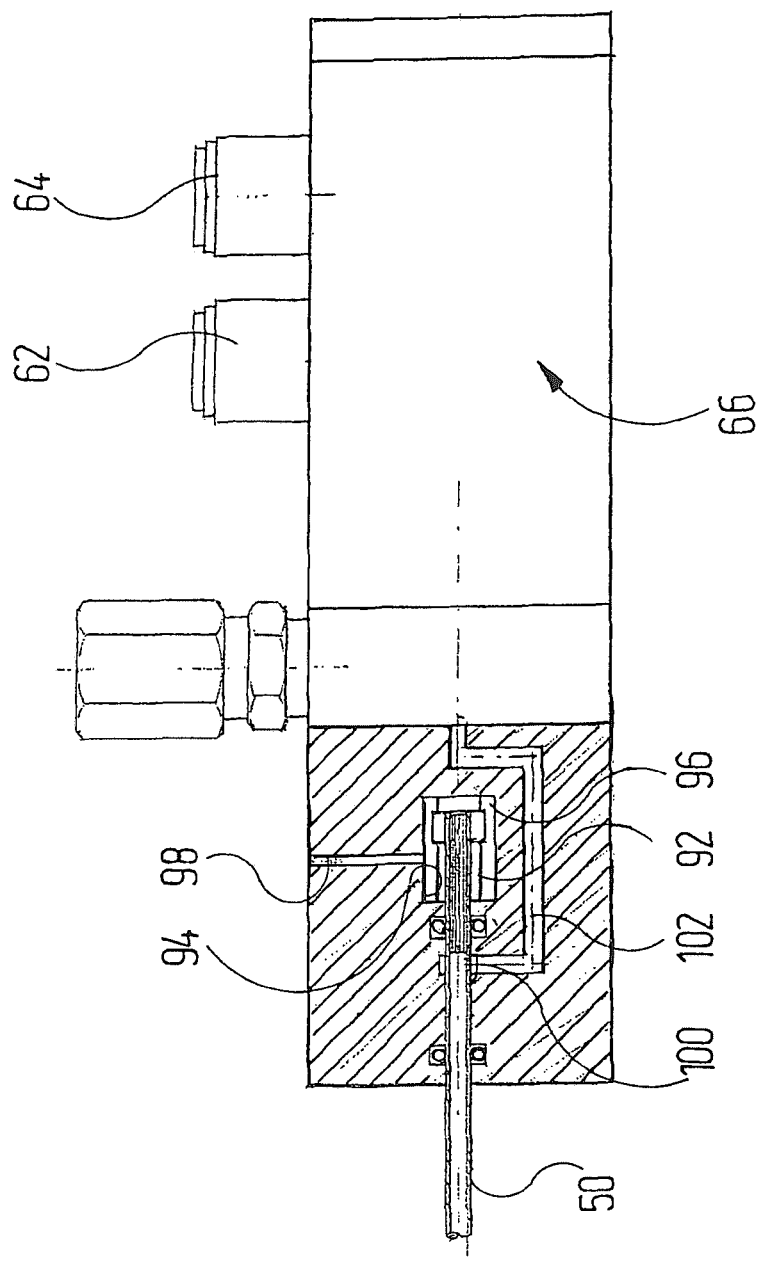
FIG. 4 a sectional view similar to FIG. 2 but in which different pivot bearings are used to support a liquid pipe against a hollow tie rod of the spindle.

FIG. 3 shows a further embodiment, in which the radial supporting of the oil pipe 50 against the tie rod 38 is effected using ball bearings. Components of the spindle according to FIG. 3 that correspond in function to previously described components of the spindle of FIGS. 1 and 2 are provided with the same reference characters, even if they differ in details, and need not be described individually in detail once more.

In the embodiment according to FIG. 3 the inner races of the pivot bearings 52 are connected in a fixed manner to the outside of the oil pipe 50, and the outer races of the foremost pivot bearing 52 is supported against a shoulder of the bore 48. The inner bearings 52-1 etc., are spaced apart by means of distance sleeves 174.

In this variant, therefore, the oil pipe 50 moves together with the tie rod 38 in axial direction when a tool carrier is to be released or tightly clamped.

In the spindle according to FIG. 3, in the region of the pivot bearing 52-1 a bypass is provided, which bypasses the only slightly air-permeable ball bearing. This bypass comprises two perforated rings 78, 80 and 82, 84, which are provided in the tie rod 38 upstream and downstream respectively of the pivot bearing 52, as well as channels 86, 88 extending obliquely relative to the spindle axis. Instead of the channels 86, 88 it might be possible to use axial grooves that are open in an inward direction and extend from the perforated rings 78, 80 to the perforated rings 82, 84.

A similar but simpler bypass is provided for the pivot bearing 52-3.

In the embodiment according to FIG. 3 the oil pipe 50 moves in axial direction together with the tie rod 38.

In a corresponding manner an axial displaceability of the end of the oil pipe 50 is provided in the base part 60. An oil-pipe anti-rotation element comprises two ribs 92, which are welded onto the outside of the end of the oil pipe 50 and cooperate with a guide groove 94, which are provided in a bearing chamber 96 of the base part. The bearing chamber 96 is vented through a channel 98 in the direction of the environment.

The feed of lubricating oil to the oil pipe 50 is effected through a bore 100 or an oblong hole in the wall of the oil pipe 50 as well as through a channel 102 of the base part 60 that is in communication with the lubricating oil connection 62.

Figure 5:
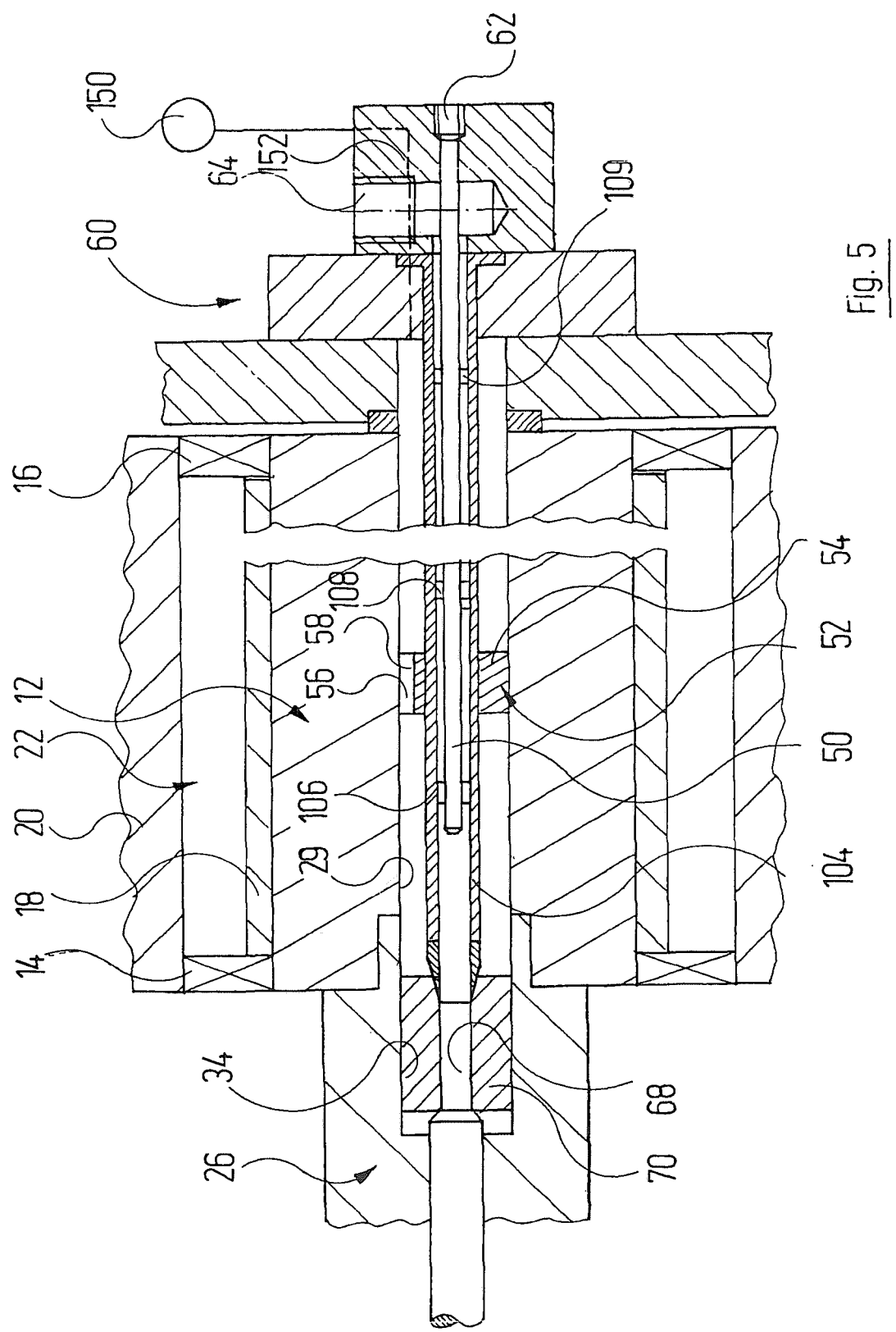
FIG. 5 a diagrammatic longitudinal section through a modified spindle, in which both a liquid pipe and a gas pipe are carried in a fixed manner by a base part of a lance unit.

FIG. 5 shows a further embodiment of a spindle, wherein only the most important parts are reproduced. The components that have already been described above in an identical function are again provided with the same reference characters, even if details have been modified.

In the embodiment according to FIG. 5 the oil pipe 50 is surrounded with radial clearance by an air pipe 104. In this case, the oil pipe 50 is connected rigidly to the air pipe 104 at three points by means of connection parts 106, 108, 109, which may have the same geometry as the slotted plain bearing sleeves shown in FIG. 2 but are flatly connected rigidly both to the oil pipe 50 and to the air pipe 104. This lends the unit formed by oil pipe 50 and air pipe 104 a high mechanical stability (shell-type construction).

The unit formed by oil pipe 50 and air pipe 104 is then radially supported likewise via a pivot bearing 52 against the spindle bore 29. Given the relatively small axial dimension of the oil pipe/air pipe unit it is sufficient to provide only a single pivot bearing. This pivot bearing has in particular the same construction as described with reference to FIGS. 1 and 2, i.e. is connected by the outer surfaces of its ribs 56 in a fixed manner to the spindle 12, while the inner surface of the hub portion 54 runs in sliding play along the outside of the air pipe 104.

In a modification, rolling-contact bearings are also eminently usable in this embodiment because the annular space between spindle bore and outer surface of the air pipe 104 is not needed to transport a fluid.

Figure 6:
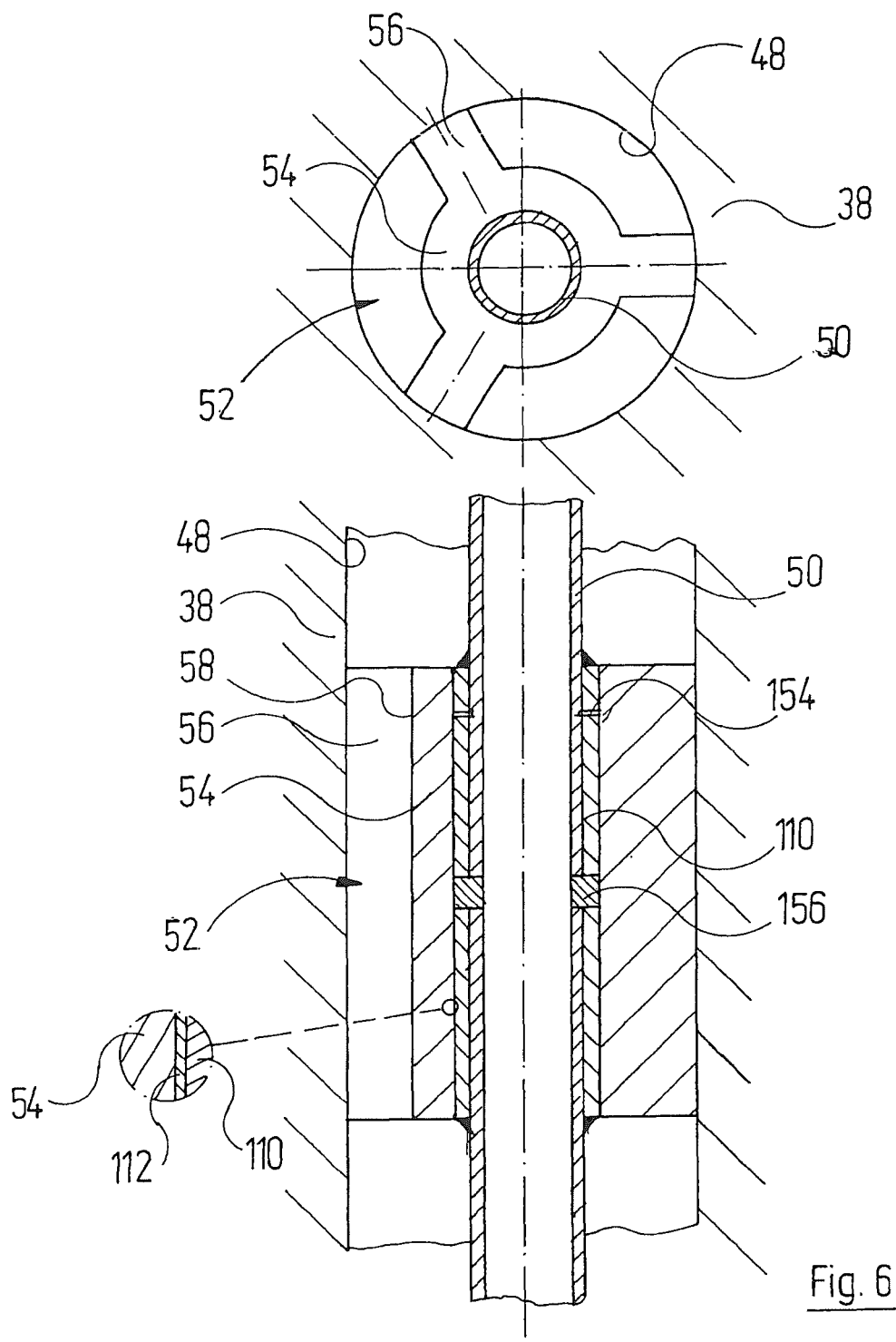
FIG. 6 a plan view and an axial section through an air-permeable plain bearing that is usable as a pivot bearing to support a liquid pipe of a lance unit.

The construction of a plain pivot bearing is represented once more in detail in FIG. 6.

This again shows the hub portion 54 of the pivot bearing 52 as well as the three ribs 56, which extend radially outwards from the hub portion 54 and situated between which are the wide grooves 58 that provide for a flow of air through the pivot bearing without extreme throttling.

FIG. 6 reveals how the inner running surface of the hub portion 54 does not run directly along the outer surface of the oil pipe 50. Rather, there is welded onto the outer surface of the oil pipe 50 an inner bearing sleeve 110 that carries on its outer surface a sliding layer 112, which cooperates with low friction with the inner surface of the hub portion 54. Typical sliding layers of this type are polished layers of hard metal oxides, metal carbides or metal nitrides, such as are known from hard metal technology. Such layers may be manufactured and machined to the desired surface finish often only in special installations.

Figure 7:
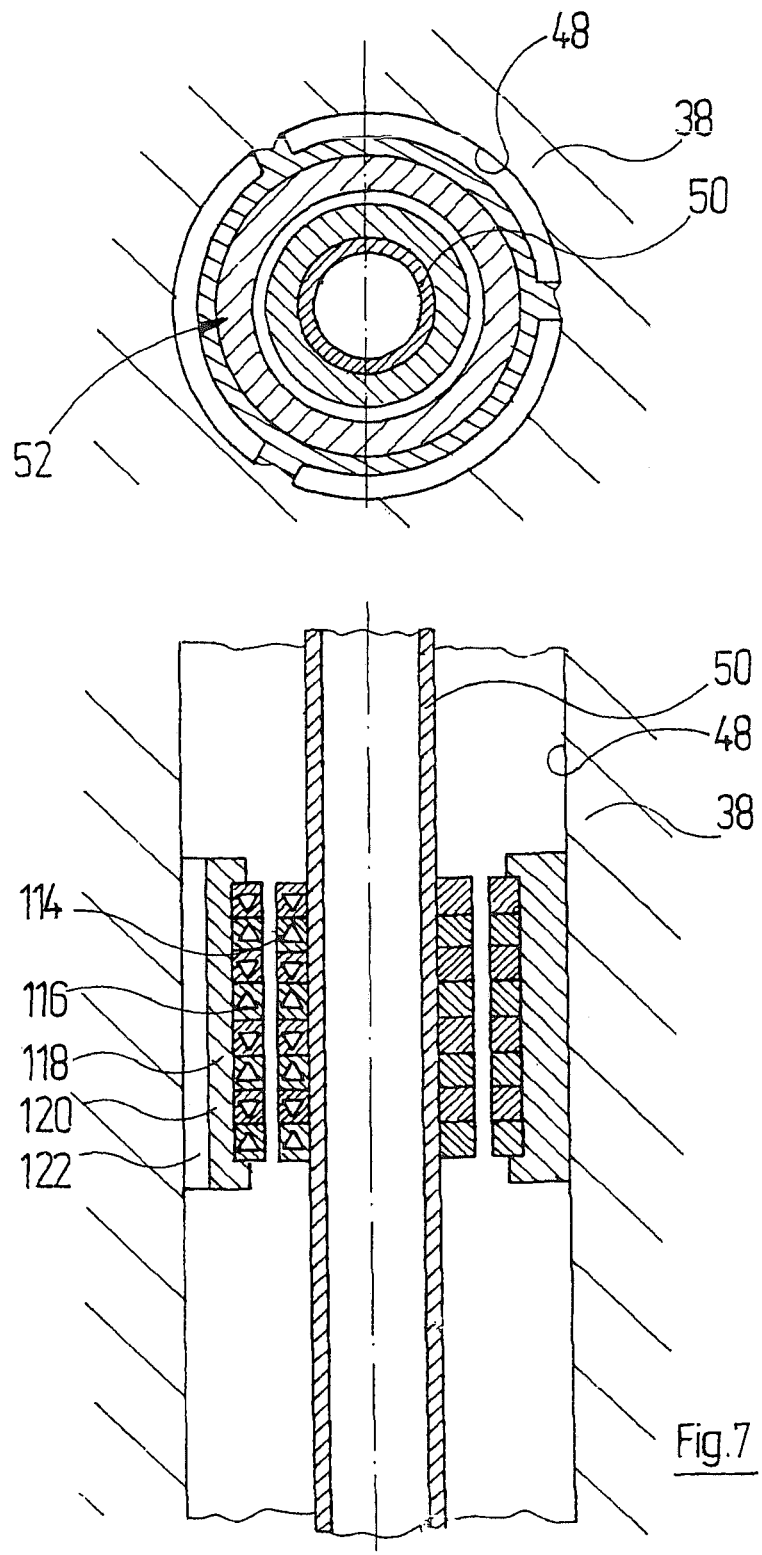
FIG. 7 a view similar to FIG. 6, in which a permanent magnet pivot bearing is used.

FIG. 7 shows a magnetic pivot bearing, which comprises an internal bearing sleeve 114 and an external bearing sleeve 116. Both bearing sleeves are made of permanent magnetic material, for example ferrite material, which is magnetized in a plurality of annular segments. In this case, the polarities of the magnetization of internal bearing sleeve and external bearing sleeve are so selected that, given axially opposed positioning, repulsive magnetic forces act between the two bearing sleeves 114 and 116, with the result that a magnetic radial bearing arrangement is obtained.

The external bearing sleeve 116 is firmly embedded in a carrying sleeve 118, which again comprises a hub portion 120 and three ribs 122 uniformly distributed in peripheral direction. The outer surfaces of the ribs 122 are connected in a fixed manner to the inner surface of a bearing bore (spindle bore or tie rod bore), the inner surface of the hub portion 120 carries the external bearing sleeve 116 in a fixed manner.

The magnetic pivot bearing shown in FIG. 7 is also capable of supporting the oil pipe 50 or an oil pipe/air pipe unit radially against a rotating spindle.

Figure 8:
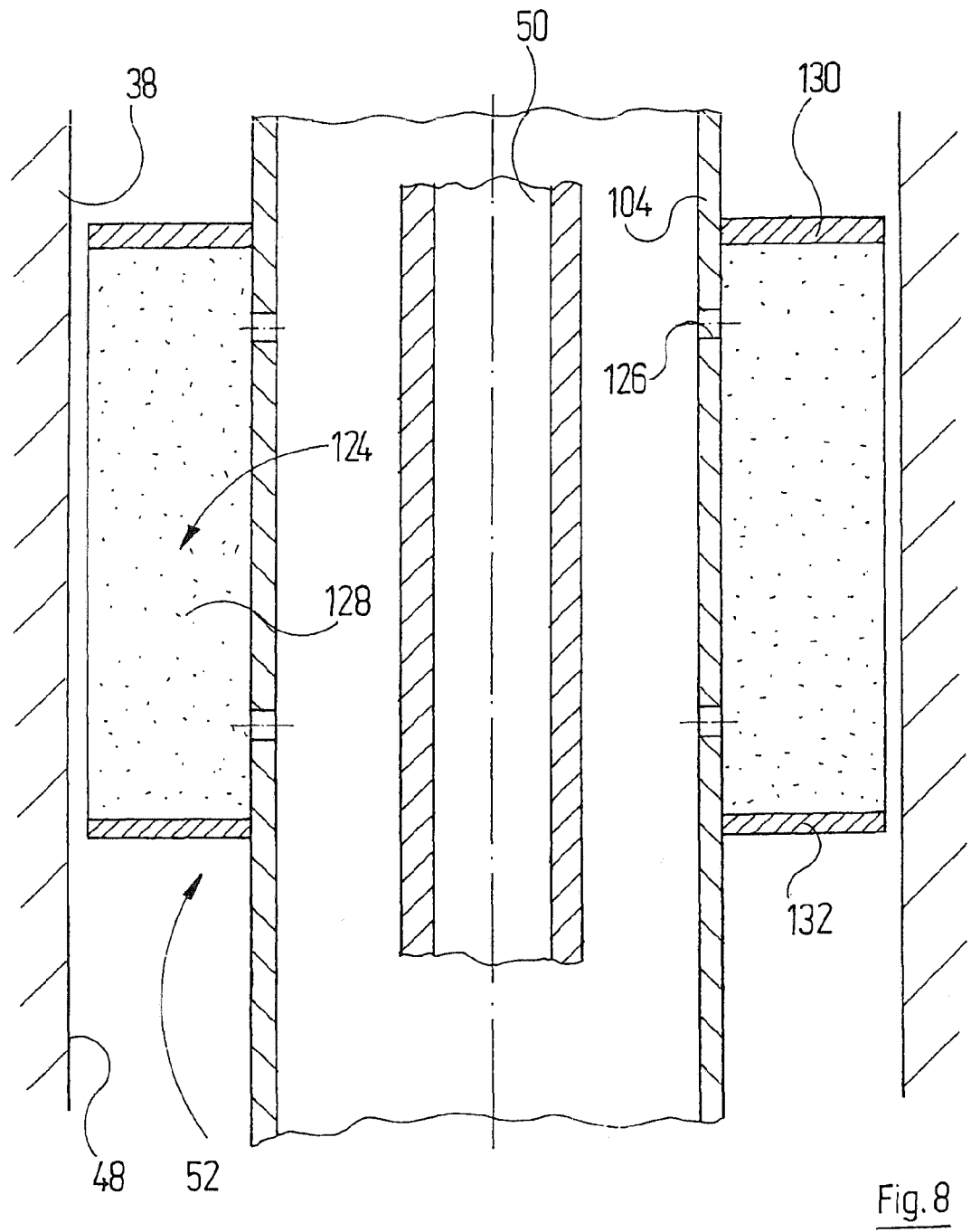
FIG. 8 a view similar to FIG. 6, in which as a pivot bearing a pneumatically loaded dynamic bearing is used.

FIG. 8 shows a pivot bearing configured as a fluid bearing and comprising a bearing drum 124 that is loaded with compressed air via openings 126 in an air pipe 104. In the bearing drum 124 an air-permeable filling material 128 may be disposed.

End walls 130, 132 of the bearing drum 124 run with greater sliding play in front of the inner surface of the spindle- or tie rod bore, thereby forming between the end walls 130, 132 a compressed-air-filled pocket that guarantees an air cushion bearing arrangement.

Figure 9:
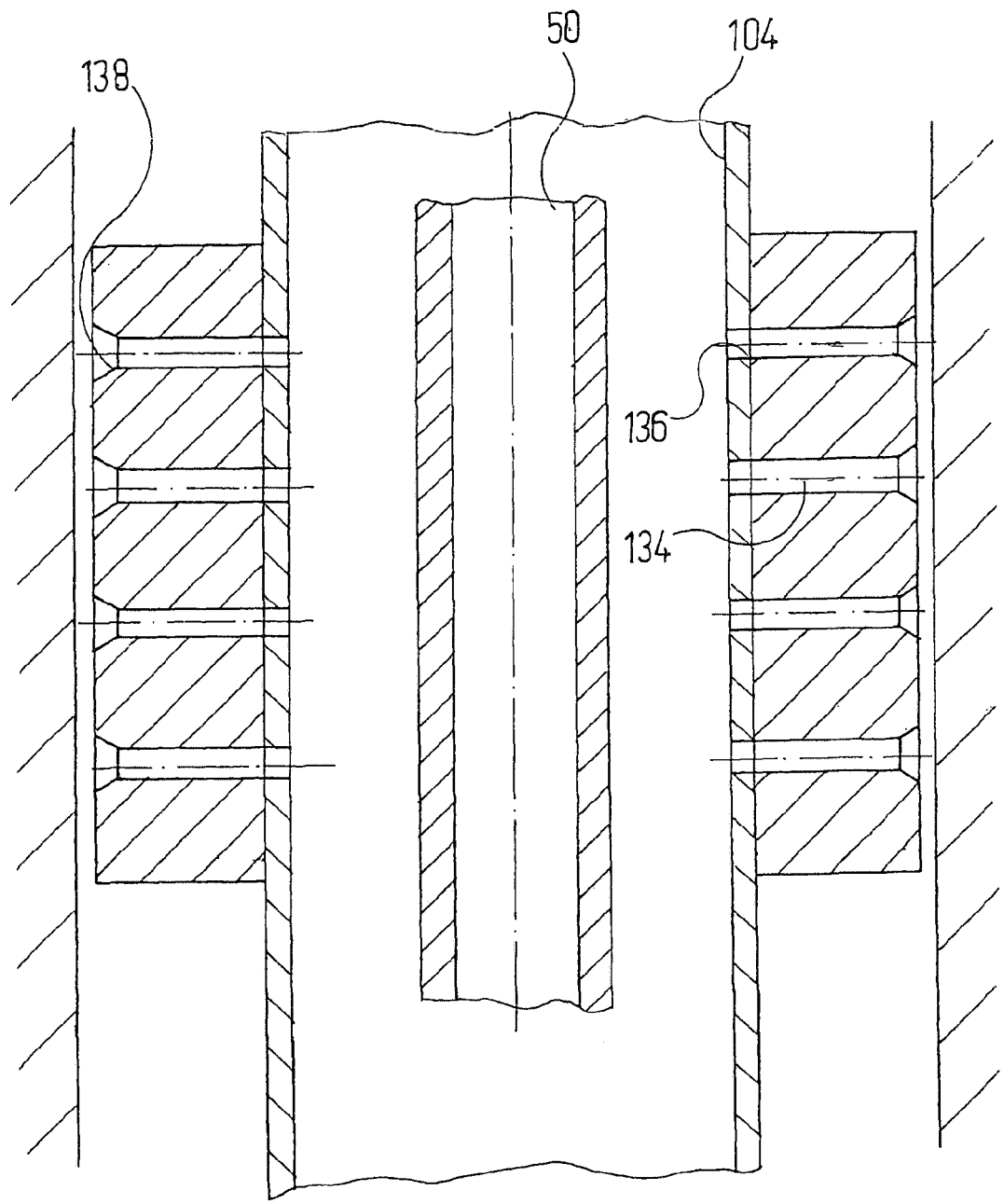
FIG. 9 a view similar to FIG. 8, in which however a modified static fluid bearing is shown.

In the case of the pivot bearing according to FIG. 9, in a solid bearing sleeve a plurality of nozzle bores 134 are provided and extend in radial direction from connection openings 136, which are provided in the air pipe 104, to the wall of the bearing bore 48. The nozzle bores 134 are flared at the free end, as shown at 138.

The nozzle bores 134 are arranged radially in rings, and a plurality of such nozzle rings are provided spaced axially apart in the bearing sleeve.

Figure 10:
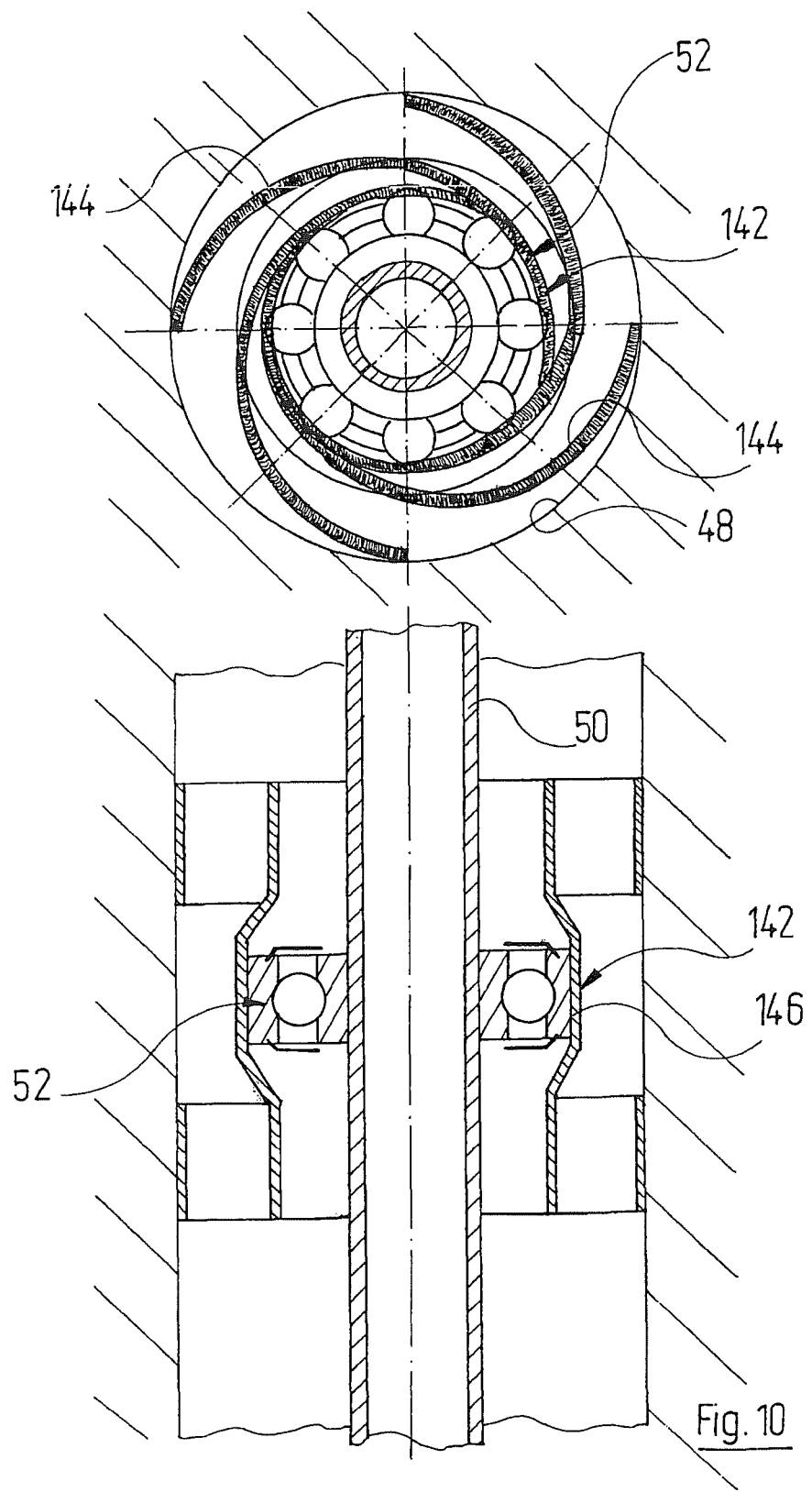
FIG. 10 a view similar to FIG. 6, in which a ball bearing is used as a pivot bearing.

The pivot bearing according to FIG. 10 is a ball bearing, the outer race of which is supported in a bearing sleeve 142. The bearing sleeve 142 is connected by spiral connection arms 144 to external mounting rings 146, which are connected in a frictionally engaged manner to the bearing bore.

The connection arms 144 may be resilient.

The bearing sleeve 142 in the axial region, in which the ball bearing is disposed, has a widening 148 with truncated-cone-shaped transition portions.

By virtue of the arrangement shown in FIG. 10 it is possible to select the diameter of the ball bearing such that it differs from that of the bearing bore of the so spindle 12 or the tie rod 38. The bearing may therefore be selected exclusively in terms of its properties and its cost. The entire bearing point likewise has good air permeability in axial direction.

The running surfaces of the pivot bearings used in the various embodiments described above may additionally themselves be lubricated. This may be effected either by means of an oil-mist stream or by a direct feed of lubricant to the running surfaces.

In FIG. 5 an oil mist source 150 that introduces oil mist through a channel 152 of the base part 60 into the annular space between air pipe 104 and spindle bore 29 is represented by dashes. By means of this oil mist the running surface between the hub portion 54 of the pivot bearing 52 and the outer surface of the air pipe 104 is lubricated.

Alternatively, a plain bearing surface that is adjacent to the oil pipe 50 may easily be lubricated by providing very fine lubricating openings 154 in the corresponding region in the oil pipe 50, as indicated in FIG. 6, or by interrupting the oil pipe 50 in selected axial portions by plain bearing rings 156, which are manufactured from slightly porous material, for example porous bronze, and become saturated with the lubricant fed in the oil pipe 50.

Figure 11:
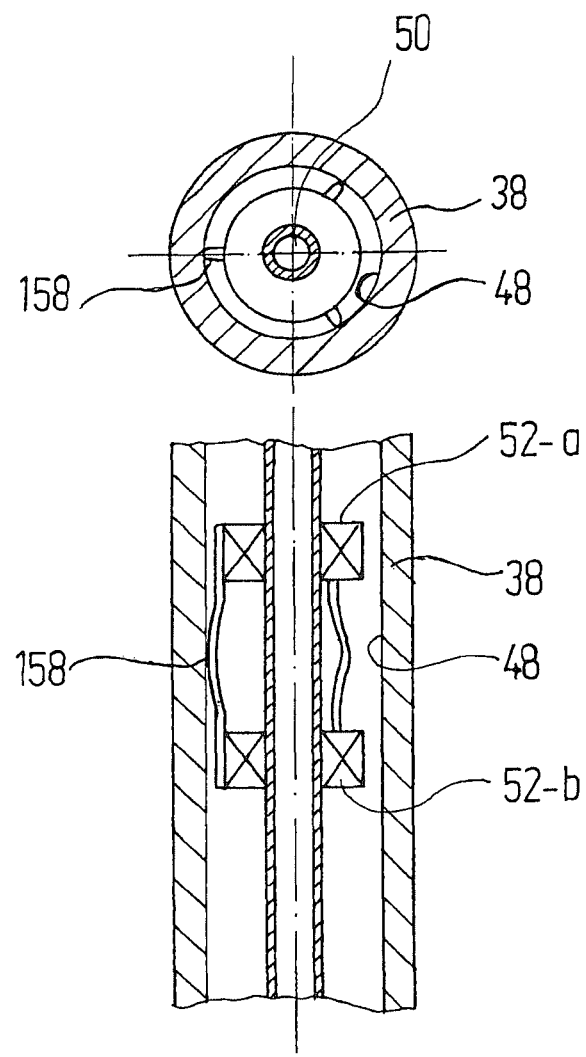
FIG. 11 an axial section and a plan view of a further modified bearing point for the liquid feed pipe.

FIG. 11 shows a further bearing point for the oil pipe 50 that comprises two ball bearings 52-a, and 52-b, which are disposed at a smaller distance from one another that is comparable to the inside diameter of the bearing bore.

The inner races of the two ball bearings are connected in a fixed manner to the oil pipe 50, the outer races are connected by three lamellae 158 made of spring steel that are uniformly distributed in peripheral direction and welded to the outer races. As is evident from the drawing, the lamellae 158 have a convexly curved geometry, and the outside diameter of the outer races of the ball bearings 52-a, 52-b is smaller than the inside diameter of the bearing bore 48.

The curvature of the lamellae 158 is so selected that the cage formed by the lamellae 158 and the outer races of the ball bearings is insertable with an interference fit into the bearing bore 48.

The cross section of the lamellae 158 is preferably a sharp-cornered rectangle as in a leaf spring, so that the lamellae 158 are seated in peripheral direction tightly in the bearing bore 48.

As a result, at the bearing point shown in FIG. 11 there is a radial spring action, which is obtained by means of the curved lamellae 158.

A further result is the pivot bearing arrangement that is realized by means of the ball bearings 52-a, 52-b.

The ball bearings are moreover axially displaceable relative to the bearing bore, this being assisted by means of the gently curved outer surface of the lamellae 158. The bearing point shown in FIG. 11 moreover also allows a slight tilting of the supported portion of the oil pipe 50 towards the exact axis of the bearing bore, because the lamellae 158 are springs and their outer surfaces are moreover of a crowned configuration.

Finally, the bearing point, apart from the ball bearings themselves, also has a practically unchanged cross section of passage for the air.

In the embodiment according to FIG. 3, in the middle of the spindle it is additionally revealed how the unit comprising oil pipe 50 and pivot bearings 52 may be inserted into a thin-walled cylindrical cartridge 160. The cartridge 160 is connected for example by spot welds to the outer races of the pivot bearings 52 and is in turn seated in a torsionally locked manner in the bore 48 of the tie rod 28.

This facilitates the mounting of the lance unit in a spindle.

As is indicated by dashes in FIG. 3, the compressed air or some of it (given an inadequate cross section of the bore 48) may be conveyed through a bypass channel 162, which emanates from a point of the tie rod 28 situated upstream of the first pivot bearing 52-1 and leads to the rear end of the spindle 12, where it leads back to the interior of the tie rod 28 or to an outlet of a compressed-air rotary coupling that is part of the base part 60.

Figure 12:
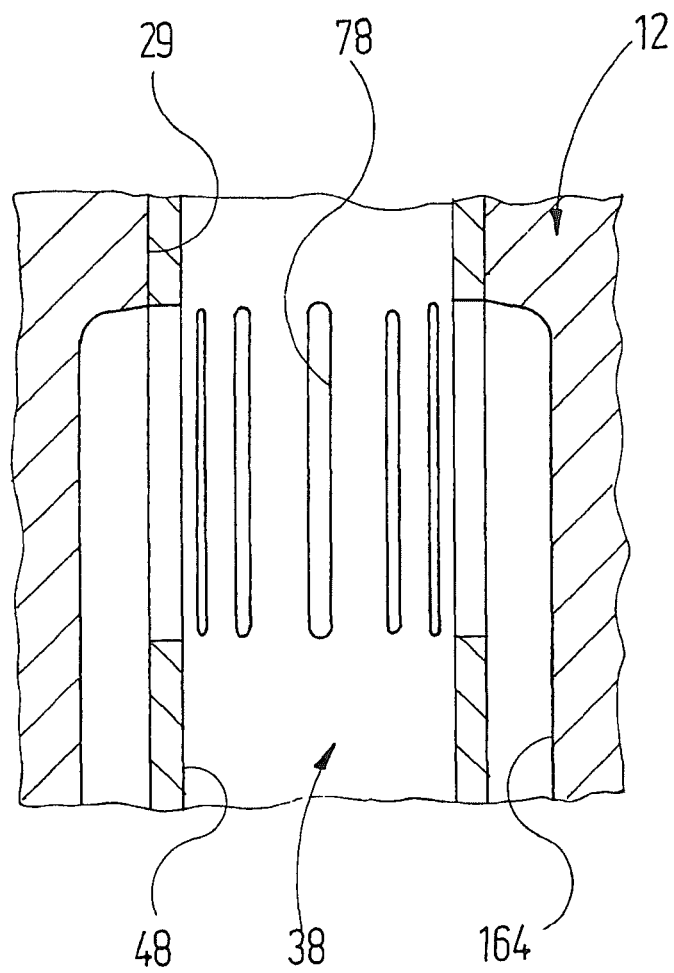
FIG. 12 a diagrammatic representation of an air transfer point between the lumen of a tool carrier tie rod and an air channel of the spindle.

In FIG. 12 an air transfer point between the interior of the tie rod 38 and a bearing bypass channel situated in the spindle 12 is shown, which may be used instead of perforated rings.

In an axially extended region, the length of which in the embodiment in question is approximately one and a half times the diameter of the bore 48, there are cut into the wall of the tie rod 38 slots 78, which have a narrow width, for example 0.2 to 0.5 mm, and are uniformly distributed in peripheral direction. Because of their length this slots, despite their narrow width, have a good total average surface area for air. As the material of the tie rod is reduced only slightly in peripheral direction, the tie rod 38 is able to transmit high loads also in the region of the slots 78.

The air that exits from the tie rod through the slots 78 is guided through a hollow-turned portion 164 of the spindle bore 29, which extends as far as the next point of air passage, to the next point of air passage where it is fed back into the interior of the tie rod through an arrangement corresponding in a horizontally mirror-inverted manner to the arrangement of FIG. 12.

Figure 13:
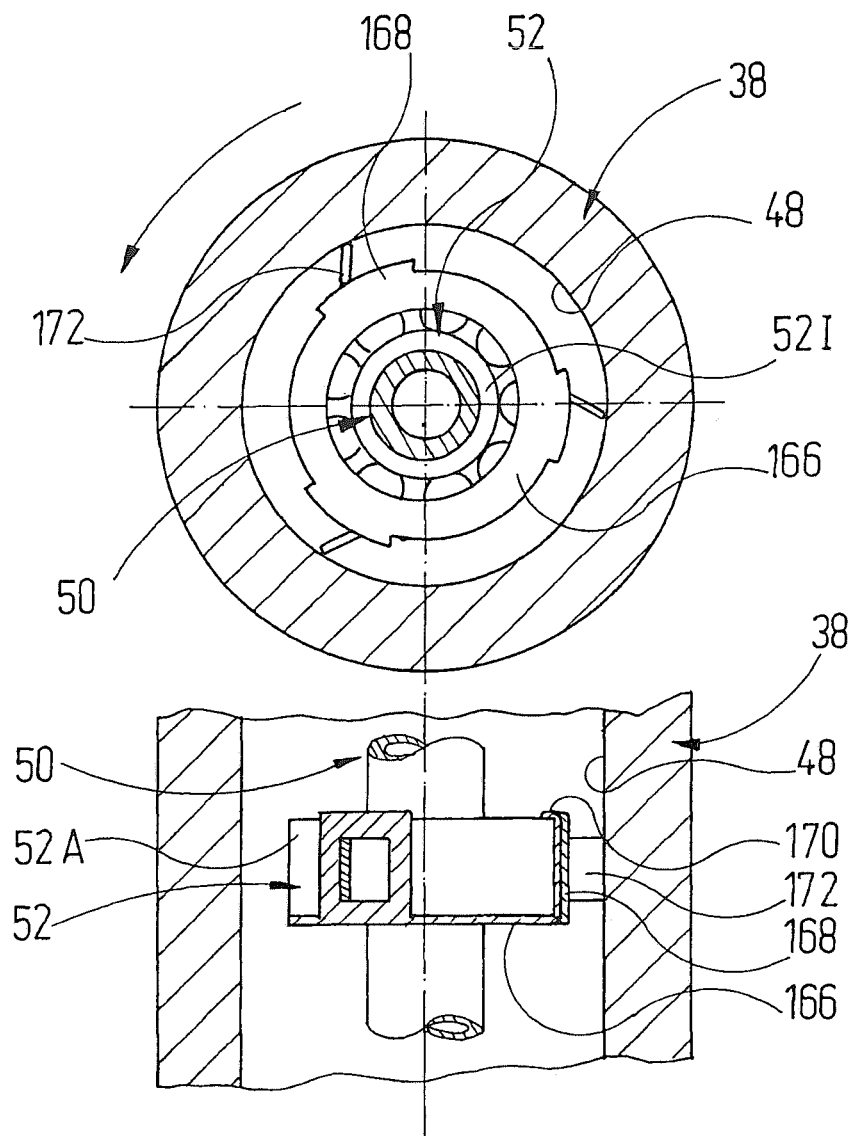
FIG. 13 a view similar to FIG. 10, in which a further modified bearing point is shown.

FIG. 13 shows a further modified bearing point that is similar to that according to FIG. 10.

Components already described above in a comparable function once more bear the same reference characters and are not described in detail again.

The pivot bearing 15 formed by a ball bearing is now seated in a bearing part 142, which comprises an annular portion 166 that overlaps the outer race 52A, but not the inner race 52I, of the ball bearing.

Moulded onto the annular portion 166 are three axial retaining arms 168 that are distributed in peripheral direction and positively encompass the lateral surface of the outer race 52-A. The retaining arms 168 carry on their ends locking tongues 170, which extend radially inwards and engage over the end face of the outer race 52A.

Rectangular carrying lamellae 172 are cut out of the wide retaining arms 168 and bent outwards so as to form with the peripheral surface of the holder arms 168 an angle of 45 degrees.

In the unloaded state the radially outer axial edges of the carrying lamellae 170 lie on a circle, the diameter of which is greater than the diameter of the bore 48. The carrying lamellae 170, inserted into the bore 48, are therefore deformed and under initial tension.

When loaded in the direction of rotation, their outermost edges cut in and the result is good self-boosting locking. The carrying part 142 may be twisted counter to the direction of rotation by the application of force. The carrying part may moreover be displaced axially by the application of force, wherein the outermost edges of the carrying lamellae 170 operate like the blades of an ice skate.

The entire carrying part is a stamped and bent component made of spring steel sheet. By expanding the cage formed by the retaining arms 168, the carrying part 142 may easily be clipped (in FIG. 13 from below) onto the ball bearing.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A lance unit for fitting into a spindle of a machine tool, the lance unit comprising:
a de-spun base portion, in which a lubricant connection is provided; and,
a liquid pipe which communicates with the lubricant connection and extends away from the de-spun base portion and includes a free end which discharges liquid in low doses the liquid pipe is carried in a rotationally fixed manner by the de-spun base portion and, wherein at least one pipe portion spaced apart from the de-spun base portion cooperates with a pivot bearing, wherein gas may flow axially through the pivot bearing, and wherein the liquid pipe cooperates with a plurality of axially spaced-apart pivot bearings, wherein at least one of the pivot bearings comprises an elastically deformable retaining part, and wherein the retaining part comprises a plurality of resilient lamellae that are distributed in a peripheral direction.

2. The lance unit according to claim 1, wherein the pivot bearings are spaced apart by means of distance bodies.

3. The lance unit according to claim 1, wherein the pivot bearing is situated closer to the free end of the liquid pipe than to a base-side end of the liquid pipe.

4. The lance unit according to claim 3, wherein either: a further pivot bearing is disposed at n/i of the length of the liquid pipe, wherein n=1, 2, 3, 4 . . . and i=2, 3, 4 . . . ; or, a further pivot bearing is disposed at $n(1/2)^i$ of the length of the liquid pipe, wherein n=1, 2, 3, 4 . . . and i=2, 3, 4, . . . .

5. The lance unit according to claim 1, wherein the pivot bearing includes outer races which are connected to a straight cartridge that forms an outer housing for the lance unit.

6. The lance unit according to claim 1, wherein the pivot bearing is selected from the following group: rolling-contact bearings; plain bearings; plain bearings with a carbon-based plain bearing material; fluid bearings; and, magnetic bearings.

7. The lance unit according to claim 6, wherein the liquid pipe carries at least one sliding layer which cooperates with an inner surface of an outer bearing sleeve having a running surface which comprises a carbon plain bearing material.

8. The lance unit according to claim 7, wherein a sliding layer is provided on an outside of an internal bearing sleeve that is carried by the liquid pipe.

9. The lance unit according to claim 1, wherein the pivot bearing has passages with an axial component of extension.

10. The lance unit according to claim 9, wherein the passages have a peripheral component of extension.

11. The lance unit according to claim 1, wherein there are at least two different types of pivot bearings.

12. The lance unit according to claim 1, wherein a base-part-side end portion of the liquid pipe is supported in a longitudinally displaceable but rotationally fixed manner in the de-spun base portion.

13. The lance unit according to claim 1, wherein the liquid pipe is surrounded by a gas pipe which is connected in a rotationally fixed manner to the de-spun base portion and is in communication with a gas connection of the de-spun base portion, and that the pivot bearing is provided outside of the gas pipe.

14. The lance unit according to claim 13, wherein the gas pipe is connected by at least one air-permeable distance part to the liquid pipe.

15. The lance unit according to claim 13, wherein a base-part-side end of the gas pipe is supported in a longitudinally displaceable but rotationally fixed manner in the de-spun base portion, and wherein gas may flow axially through the pivot bearing and the pivot bearing has passages with an axial component of extension and a peripheral component of extension.

16. The lance unit according to claim 1, wherein the pivot bearing is configured as self-aligning bearing and includes an outer race that is a crowned outer surface.

17. The lance unit according to claim 1, wherein the lamellae comprise a lamella portion that, viewed from an outside, is convex.

18. The lance unit according to claim 1, wherein a common resilient connection part is provided for two adjacent pivot bearings.

19. The lance unit according to claim 1, further comprising a lubricant feed device that supplies the pivot bearing with a lubricant.

20. A spindle comprising:
a lance unit according to claim 1, wherein the de-spun base portion comprises a gas rotary coupling; and,
a gas channel that rotates with the spindle.

21. The spindle according to claim 20, wherein the gas channel leads from a point adjacent to the de-spun base portion to a point adjacent to the free end of the liquid pipe.

22. The spindle according to claim 21, wherein the gas channel is formed in part by a spindle bore, in which the lance unit is accommodated, and in part by bypass channels which are worked into the spindle so as to bypass the pivot bearing.

23. The spindle according to claim 22, wherein disposed in the spindle bore is a tie rod that extends between a clamping cylinder and a tool carrier collet chuck, and wherein the lance unit is disposed in an interior of the tie rod with the pivot bearing disposed therebetween.

24. The spindle according to claim 23, wherein the tie rod in the region of the gas channel comprises a ring of passages in the shape of axial slots, which have an axial dimension that is at least 5 times a peripheral extent.

25. A lance unit for fitting into a spindle of a machine tool, the lance unit comprising:
a de-spun base portion, in which a lubricant connection is provided; and
a liquid pipe which communicates with the lubricant connection and extends away from the de-spun base portion and includes a free end which discharges liquid in low doses the liquid pipe is carried in a rotationally fixed manner by the de-spun base portion and, wherein at least one pipe portion spaced apart from the de-spun base portion cooperates with a pivot bearing, wherein gas may flow axially through the pivot bearing, and wherein the liquid pipe cooperates with a plurality of axially spaced-apart pivot bearings, wherein at least one of the pivot bearings comprises an elastically deformable retaining part, and wherein a common resilient connection part is provided for two adjacent pivot bearings.

26. A spindle comprising:
a lance unit having a de-spun base portion, in which a lubricant connection is provided;
and, a liquid pipe which communicates with the lubricant connection and extends away from the de-spun base portion and includes a free end which discharges liquid in low doses the liquid pipe is carried in a rotationally fixed manner by the de-spun base portion and, wherein at least one pipe portion spaced apart from the de-spun base portion cooperates with a pivot bearing, wherein gas may flow axially through the pivot bearing, wherein the de-spun base portion comprises a gas rotary coupling; and, a gas channel that rotates with the spindle, wherein the gas channel leads from a point adjacent to the de-spun base portion to a point adjacent to the free end of the liquid pipe and the gas channel is formed in part by a spindle bore, in which the lance unit is accommodated, and in part by bypass channels which are worked into the spindle so as to bypass the pivot bearing.

27. The spindle according to claim 26, wherein disposed in the spindle bore is a tie rod that extends between a clamping cylinder and a tool carrier collet chuck, and wherein the lance unit is disposed in an interior of the tie rod with the pivot bearing disposed therebetween.

28. The spindle according to claim 27, wherein the tie rod in the region of the gas channel comprises a ring of passages in the shape of axial slots, which have an axial dimension that is at least 5 times a peripheral extent.

* * * * *